J. D. VAN HOEVENBERGH.
Carriage.
No. 78,340.
2 Sheets—Sheet 1.
Patented May 26, 1868.
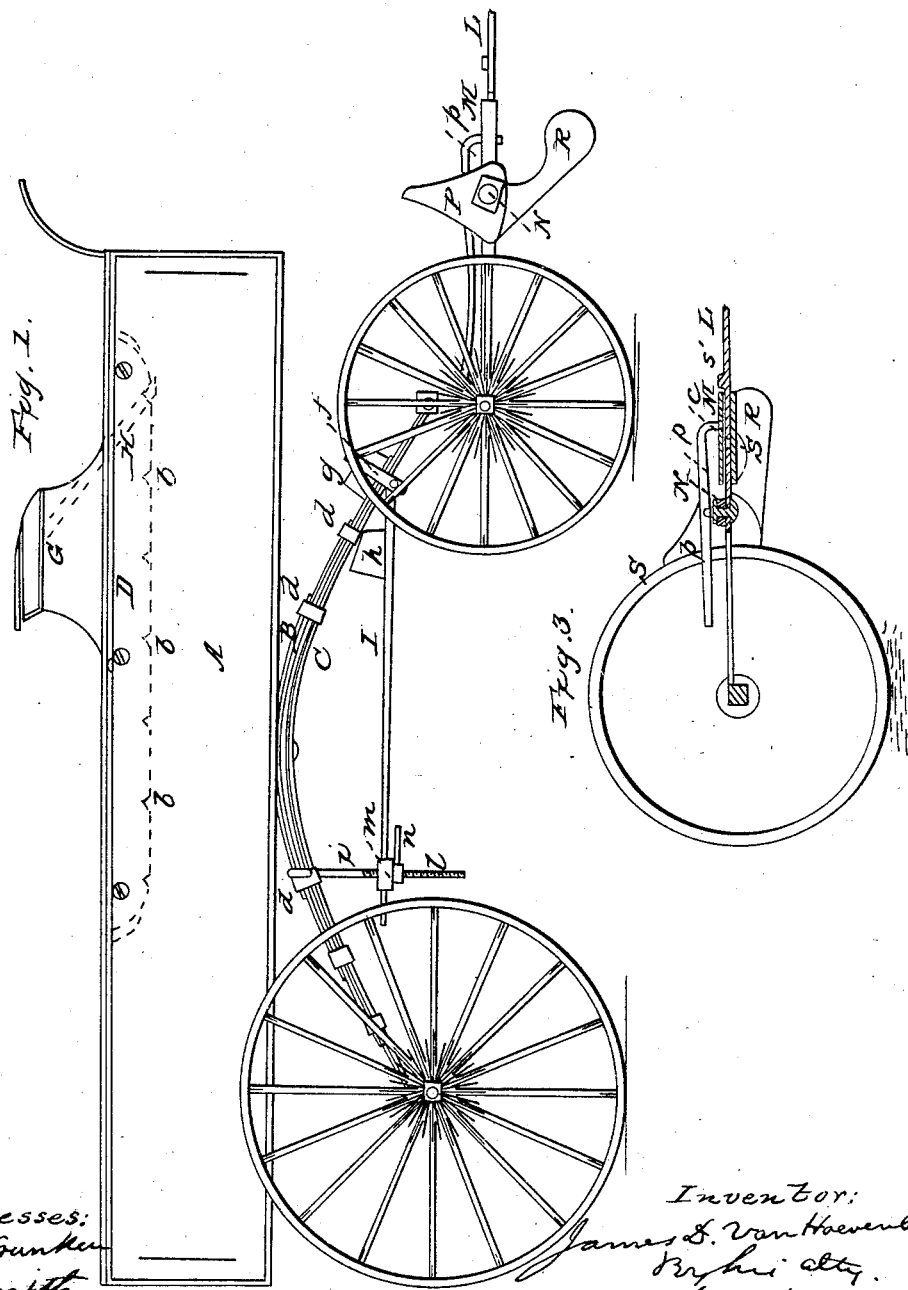

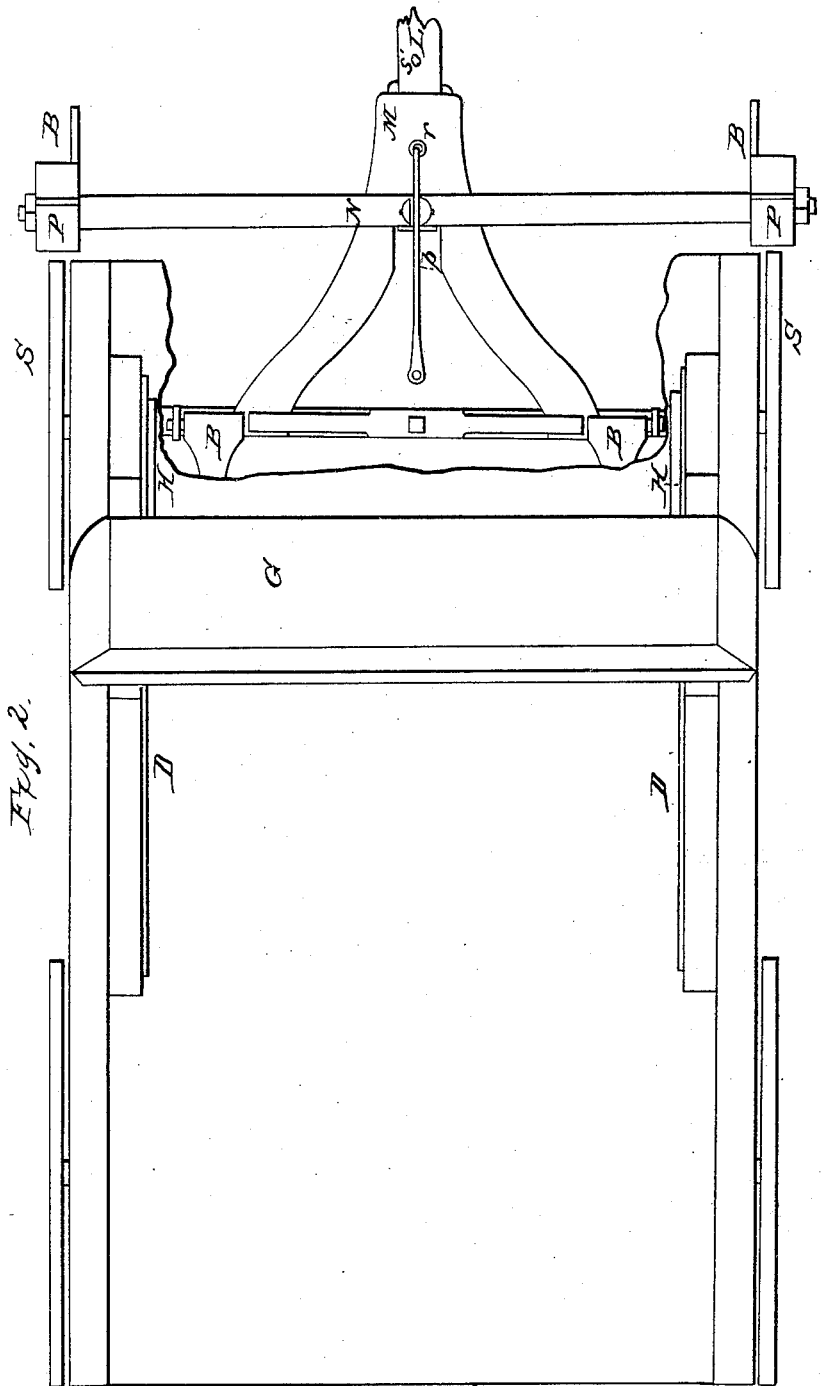

United States Patent Office.

JAMES D. VAN HOEVENBERGH, OF KINGSTON, NEW YORK.

Letters Patent No. 78,340, dated May 26, 1868.

IMPROVEMENT IN CARRIAGES.

The Schedule referred to in these Letters Patent and making part of the same.

TO ALL WHOM IT MAY CONCERN:

Be it known that I, JAMES D. VAN HOEVENBERGH, of Kingston, in the county of Ulster, and State of New York, have invented Improvements in Carriages and Wagons; and I do hereby declare that the following is a full and exact description thereof, reference being had to the accompanying drawings, making part of this specification.

Figure 1, a side elevation of a wagon provided with my improvements.
Figure 2, a top view thereof.
Figure 3, a diagram illustrating the manner in which the brake operates.
Like letters designate corresponding parts in all of the figures.

My first improvement consists in a peculiar device for fastening movable seats of wagons and vehicles. On the inside of the wagon-body A, at each side, is secured a strap or plate, D, of iron, notched in its lower edge, at proper intervals, as at $b\ b$; the notches at the two sides of the wagon-body being equidistant, and accurately opposite to one another respectively. The seat G has a hook, H, at each end, extending forward and downward, as shown in fig. 1, and projecting at the lower end laterally outward, under each side-strap respectively. The relative arrangement of the seat-straps and hooks is such that, on lifting the seat a little, the hooks will be released from the notches $b\ b$, and then the seat can be freely moved backward or forward; but when the ends of the hooks H H are brought directly under any of the notches $b\ b$, then the seat can be lowered, the hooks entering the notches, and thereby securely holding the seat in place. This is a very secure fastening, and enables the seat to be easily moved.

Another improvement consists in the employment of a strap, C, of India-rubber belting, stretched under each spring, B, of a carriage or wagon, it being fastened at the forward end, between the lapped end of the lower leaf of each spring and the part against which the end laps, and at the rear end between the end of the spring and the hind axle. The clamping-surfaces are roughened, to make them hold the better. The India-rubber straps are held to the spring, at short intervals, by clips or bands, $d\ d$, preferably of metal, though bands of India rubber may answer.

The object of these straps is to support and hold up the carriage-body, in case the spring or springs break, and thereby furnish a temporary security and substitute for the spring, if such an accident occurs.

The vulcanized India rubber is the best material for the purpose known to me, being strong, elastic, and very durable under exposure to the atmosphere.

Its construction and operation are indicated in fig. 1. A lever, I, has its fulcrum at one end, where it is pivoted to a shackle-link, $f$, that is put around the spring near the bent place, a fulcrum-block, $g$, being applied on the spring, for the link to bear upon, so as not to strain the spring at the place. A movable block, $h$, is applied between the lever and the bent part of the spring. The other end of the lever extends through or is attached to a block, $m$, which slides up and down on the shank of a hook, $i$, which is hooked up around the spring in the proper position. The hook has a screw, $l$, on its shank, and a nut, $n$, with a handle, by turning which the end of the lever is raised, exerting a powerful action on the spring where the block $h$ bears, sufficient to reset it into its proper form.

My next improvement consists in an improved self-acting brake, applied in front of the front wheels S S. A brake-bar, N, which is designed to be or act as the double whiffle-tree, is secured to the rear end of the tongue L, which has a sliding movement a short distance in the hounds M M, as shown. When the wagon is descending a hill, the tongue slides back and forces the brake-blocks P P back against the wheels. When it is desired to back the wagon, a coupling-pin, $r$, extends down through the hounds, and a hole, $s$, in the tongue, so as to prevent the latter's sliding in the hounds. This pin can be raised out of the holes, by being attached to a lever, $p$, to be operated by the driver's foot.

I have also an improved balanced brake-block, P. It swings freely on a journal at the end of the brake-bar or double whiffle-tree N, and has a balancing projection or weight, R, of iron upon it, so arranged as to keep the face of the block away from the wheel ordinarily. But it does not interfere with the self-acting movement of the block when descending a hill.

What I claim as my invention, and desire to secure by Letters Patent, is—

The combination and arrangement of the notched side-plates D D, and inclined hooks H H, for fastening movable seats, substantially as and for the purpose herein specified.

I also claim the India-rubber straps C C, under the springs B B, secured thereto, and arranged in combination therewith, substantially as and for the purpose herein set forth.

I also claim the brake-blocks P P, balanced by the counter-weights R R, in combination with the double whiffle-tree brake-bar N, and sliding tongue L, substantially as and for the purpose herein specified.

The above specification of my improvements in carriages and wagons signed by me, this 16th day of December, 1867.

JAS. D. VAN HOEVENBERGH.

Witnesses:
W. H. HILL,
JOHN GILL.